Oct. 9, 1962 T. L. ETTER 3,057,551
FLUID PRESSURE DIGITAL COMPUTER
Filed Feb. 19, 1957 6 Sheets-Sheet 1

INVENTOR.
THOMAS L. ETTER
BY Darby & Darby
ATTORNEYS

Oct. 9, 1962     T. L. ETTER     3,057,551
FLUID PRESSURE DIGITAL COMPUTER

Filed Feb. 19, 1957     6 Sheets-Sheet 2

INVENTOR.
THOMAS L. ETTER
BY Darby & Darby
ATTORNEYS

Oct. 9, 1962 T. L. ETTER 3,057,551
FLUID PRESSURE DIGITAL COMPUTER
Filed Feb. 19. 1957 6 Sheets-Sheet 3

INVENTOR.
THOMAS L. ETTER
BY Darby & Darby
ATTORNEYS

Oct. 9, 1962

T. L. ETTER

3,057,551

FLUID PRESSURE DIGITAL COMPUTER

Filed Feb. 19, 1957

INVENTOR.
THOMAS L. ETTER
BY Darby & Darby
ATTORNEYS

Oct. 9, 1962 T. L. ETTER 3,057,551
FLUID PRESSURE DIGITAL COMPUTER
Filed Feb. 19, 1957 6 Sheets-Sheet 5

INVENTOR.
THOMAS L. ETTER
BY Darby & Darby
ATTORNEYS

Oct. 9, 1962 T. L. ETTER 3,057,551
FLUID PRESSURE DIGITAL COMPUTER
Filed Feb. 19, 1957 6 Sheets-Sheet 6

FIG. 16

INVENTOR
THOMAS L. ETTER
BY Darby & Darby
ATTORNEYS

United States Patent Office 3,057,551
Patented Oct. 9, 1962

3,057,551
FLUID PRESSURE DIGITAL COMPUTER
Thomas L. Etter, New York, N.Y., assignor, by mesne assignments, to TRG Incorporated, Long Island City, N.Y., a corporation of New York
Filed Feb. 19, 1957, Ser. No. 641,109
16 Claims. (Cl. 235—61)

The present invention relates to a fluid pressure digital computer and more particularly to such a computer which is constructed of a number of fluid pressure relays interconnected by fluid channels to form a computer system.

It is an object of the present invention to provide a computer having a number of computer elements, each computer element comprising one or more fluid pressure relays interconnected by fluid channels.

It is another object of the present invention to provide a fluid pressure digital computer in which the individual fluid pressure relays may be constructed of very small size and the interconnecting channels between the relays may be arranged very compactly to provide a computer device of very small size.

It is another object of the present invention to provide a fluid pressure digital computer comprising a large number of interconnecting fluid pressure relays wherein the relays are of a laminar type and are susceptible of being fabricated by stamping or otherwise from very thin sheet material.

It is still another object of the present invention to provide a fluid pressure digital computer wherein the fluid pressure relays are of very small size and so constructed that a minimum of power is consumed in the operation of said relays and hence the computer consumes a minimum amount of power and presents little or no cooling problem.

It is still another object of the present invention to provide novel laminar type fluid pressure relays for use in a fluid pressure digital computer.

It is a further object of the present invention to provide a particular type of interconnecting channel arrangement for use in a fluid pressure digital computer of laminar construction wherein intricate interconnection schemes may be accomplished by the use of relatively few different types of elements.

It is a still further object of the present invention to provide particular elements of interconnecting fluid pressure relays for the performance of basic logical functions in a fluid pressure digital computer.

Other objects and advantages will be apparent from a consideration of the following description in conjunction with the appended drawings, in which.

Figures 1, 2, 3, 4, 5:
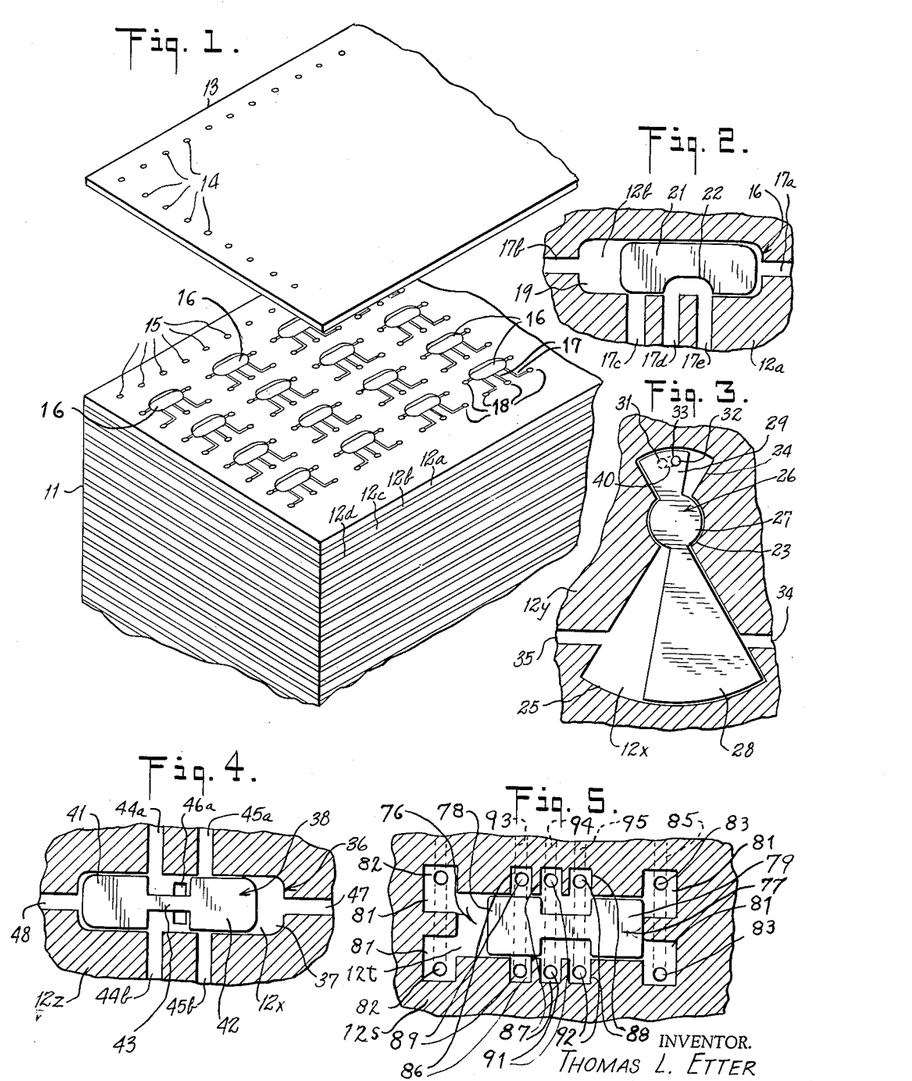
FIGURE 1 is an isometric view of a computing device according to the present invention.
FIGURE 2 is a sectional view showing a laminar type fluid pressure relay suitable for use in the device of FIGURE 1.
FIGURE 3 is a sectional view of an alternative type fluid pressure relay having a rotatable piston or armature and also suitable for use in the device of FIGURE 1.
FIGURE 4 is a horizontal sectional view of a second alternative type fluid pressure relay wherein the fluid pressure forces are balanced to minimize friction.
FIGURE 5 is a horizontal sectional view of another alternative balanced forces fluid pressure relay.

Referring to FIGURE 1 a fluid pressure digital computer unit is shown at 11. The computer unit 11 is of laminated construction, being composed of a substantial number of relatively thin sheets 12a, 12b, 12c, etc.

A cover plate 13 is provided for the computer unit 11 and is shown removed to expose the interior of the computer unit. The cover 13 is provided with a number of fluid ports 14. The fluid ports 14 would in practice be connected to receive fluid pressure signals and to transmit fluid pressure signals. The fluid could be gaseous, for example air; or it could be liquid, such as water or oil. The received signals would of course carry the information upon which computational operations are to be performed and might also carry instructional information relative to the computations to be performed on the information. The transmitted signals would of course carry the information regarding the result of the computation.

The fluid pressure ports 14 may communicate with vertical channels 15 formed by aligned apertures in the sheets 12 composing the computer unit 11. The channels 15 will provide vertical communication channels through the computer unit 11 for interconnection of the various elements of the computer, as well as providing communication with the fluid pressure ports 14.

It will be understood that the pressure signals applied to the ports 14 may be derived from manually operated valves connected to a fluid pressure source or in some cases may be derived from valves operated electrically or otherwise where it is desired to utilize a computer unit of the present invention in conjunction with electrically or mechanically operated data handling devices. Similarly, the output signals from the computer unit 11 may be converted to electrical or mechanical signals for recording or direct observation. The generation and utilization of the fluid pressure signals may be accomplished in a number of well known manners and since the present invention is not primarily concerned with these features, they are not discussed at length but are only mentioned in passing.

The source of fluid pressures for operating the computer elements is not required to have particularly critical characteristics. As will be explained, it is preferred that three pressures are provided—a low, intermediate, and high pressure. One of the three may be atmospheric pressure if desired. High pressures are not required; a pressure difference of 10 lbs./sq. in. between the respective pressure values is quite adequate.

The thin sheet or plate 12a is provided with cutaway portions to provide chambers for a number of fluid pressure relays 16 shown in detail in FIGURE 2. Each of the fluid pressure relays is associated with a number of channels 17 cut in the plate 12a. The channels 17 lead to respective ports or apertures 18 in the plate 12a. It will be noted that the ports 18 may be arranged in a uniform pattern in the plate 12a as shown in FIGURE 1.

The construction of the fluid pressure relays 16 is shown in FIGURE 2. An elongated opening 19 is provided in the plate 12a. The subjacent plate 12b has no such opening, nor does the cover plate 13, so that a chamber is formed by the opening 19 in the plate 12a in conjunction with plates 12b and 13.

Within this chamber there is a floating piston 21 which may be of uniform cross-section and formed, by stamping for example, from a sheet of thin material. It is preferred that the thickness of the piston or armature 21 be slightly less than the thickness of the plate 12a so that the piston 21 slides freely between the cover plate 13 and the subjacent plate 12b. This may be readily accomplished by stamping the piston 21 from sheet material of slightly lesser thickness than the sheet material utilized from the plate 12a.

The piston 21 is provided with an indentation 22. Three fluid channels 17c, 17d and 17e are provided communicating with the chamber 19. These channels may be provided by stamping slots in the plate 12a. The indentation 22 is located and dimensioned so that when the piston 21 is at one end of the chamber 19, communication is provided between channels 17c and 17d, while channel 17e is closed or blocked. On the other hand, when the piston 21 is located at the other end of the chamber 18, channels 17d and 17e are interconnected while channel 17c is closed.

The movement of the piston 21 is accomplished by creating a difference in fluid pressure between the channels 17a and 17b. It will be observed that where the fluid pressure supplied at 17b is greater than that supplied at 17a, the piston will be moved to the right, whereas supplying a greater pressure at channel 17a than the channel 17b will cause the piston 21 to be moved to the left.

Thus the relay is in effect a fluid pressure operated valve, the illustrated form having a control port, a bias port and three controllable ports, the center one of which is selectively coupled to one of the others.

The fluid pressure relay 16 is shown merely by way of example. Obviously numerous variations in the particular design of a fluid pressure relay could be made and applied to the present invention. The laminar construction of the relay 16, although not essential to the present invention, is nevertheless an important feature. Clearly the laminar construction makes possible the fabrication of relays in an extremely simple and inexpensive manner.

The laminar relays also lend themselves readily to combination in large numbers without requiring an extensive amount of space. In this regard it has been determined that a laminar relay of the type shown in FIGURES 1 and 2 may have a thickness of 1/32" or less. Sheet metal formed to a thickness having a close tolerance is readily available and is suitable for the fabrication of relay plates such as 12a in FIGURE 1. As may be seen from this figure the width of the chamber need not exceed 3 to 5 times its thickness and the length may be two to four times the width approximately. It is readily apparent that by fabricating relays of such small dimensions, it is possible to provide a very compact computer unit relative to the number of relays contained.

An alternative laminar type relay is shown in FIGURE 3. The fluid pressure relay 23 has a vane or piston 26 arranged for limited rotational movement in contradistinction to the piston 21 of FIGURE 2 having linear movement. The relay 23 consists of an opening in a plate 12y together with a piston 26 situated within the opening. The relay is enclosed by a subjacent plate 12x and a similar plate not shown which would form a top cover for the relay.

The piston 26 has a central portion formed in the shape of a circle and located within a similarly shaped portion of the aperture in the relay plate 12y. The aperture in the relay plate 12y has segmental portions 24 and 25 on opposite sides of the central portion. The piston 26 also has oppositely extending portions 28 and 29 which are segmental in shape. The angle between the sides of the segmental portions 28 and 29 are less than the angles between the sides of the segmental portions 24 and 25 of the aperture in the relay plate 12y. Thus the armature 28 is free to rotate through a small angle within the aperture in the plate 12y. One of the segmental portions 29 of the piston 26 is provided with a hole 33. When the piston 26 is rotated to its clockwise position the hole 33 coincides with a hole 32 in the subjacent plate 12x. When the piston is rotated to its counterclockwise position the hole 33 will coincide with a second hole 31 in the subjacent plate 12x. The cover plate (not shown) will be provided with an elongated hole 40 so that when the piston is turned to the counterclockwise position communication will be provided between the hole 40 and the hole 32. On the other hand, when the piston is rotated to its counterclockwise position the hole 31 will be interconnected with the hole 40.

The piston 26 is rotated by providing a pressure differential at ports 35 and 34 opening into the lower segmental portion 25 of the relay of FIGURE 3. It will thus be apparent that the relay shown in FIGURE 3 accomplishes the same functions as the relay shown in FIGURE 2, namely the selective interconnection of one of two fluid ports with a third fluid port in response to a pressure differential between fourth and fifth fluid ports. The fluid pressure relay of FIGURE 3 may be more desirable in some instances due to the fact that the piston portion 28 of the armature 26 may be elongated to any desired extent to provide increased force and increased leverage to overcome any frictional forces resulting from pressure differentials at ports 31 and 32.

A third alternative fluid pressure relay is shown in FIGURE 4. The relay of FIGURE 4 is designed to eliminate frictional resistance due to unbalanced fluid pressures in the valve portion of the relay. A plate 12z is cut away to form a chamber 37 for a fluid pressure relay 36. Chamber 37 is enclosed by a subjacent plate 12x and a superjacent plate not shown. A piston 38, which may be formed of sheet material as before, is located within the chamber 37. The piston 38 has enlarged ends 41 and 42 fitting snugly within the chamber 37 and a narrow central portion 43 which performs the valve function in the relay 36. In the relay 36 two lefthand ports 44a and 44b are provided on opposite sides of the chamber 37 and two righthand ports 45a and 45b are provided on the righthand sides of the chamber 37. Ports 44a and 44b are interconnected so that the same pressure is supplied to both. The same is also true of ports 45c and 45b. It will be noted that ports 45a and 45b correspond to ports 17c in FIGURE 2 while the ports 45a and 45b correspond to ports 17e in FIGURE 2. A center port 46a is provided by an aperture in the subjacent plate 12x. A similar aperture is provided in the superjacent plate not shown. These two center ports are also interconnected. Control ports 47 and 48 are provided to control the position of the piston 38 corresponding to ports 17a and 17b of FIGURE 2.

A further alternative relay arrangement is illustrated in FIGURE 5. The relay 76 in FIGURE 5 is similar to the relay shown in FIGURE 4 in that it is of the balanced type. The chamber for the relay 76 is formed by cutting out a plate 12s. In the chamber there is placed an armature or piston 77 similar to the piston previously shown in FIGURE 4 in that it has indentations on both sides of the armature.

Enlarged portions 78 and 79 of the piston 77 fit snugly in the relay of the chamber 76 as before. Rectangular cutouts 81 are provided at the corners of the chamber of the relay 76 so that control ports 82 and 83 located in the subjacent plate 12t will not be obscured. Further cutouts 86, 87 and 88 are provided in the sides of the chamber for the location of inlet and outlet ports 89, 91 and 92. The control ports 82 are interconnected by means of a channel 84 cut in the plate immediately below the plate 12t and not shown in FIGURE 5. A similar channel 85 is provided for control ports 83 and more like chanels 93, 94 and 95 are also provided for inlet and outlet ports 86, 87 and 88, respectively.

It will thus be seen from FIGURES 4 and 5 that the fluid pressure relays provided therein have pairs of oppositely situated valve ports which are interconnected so that the forces created by the pressures at the valve portion of the relay are balanced, and thus any frictional forces which might result from unbalanced valve port pressures are eliminated. It will be obvious that many similar arrangements could be devised to provide such a balanced type fluid pressure relay for use in a computer according to the present invention.

Three different types of fluid pressure relays have been shown in FIGURES 2, 3, 4 and 5 which have various advantages which may be desirable in particular situations. It should be understood, however, that the invention is not limited to particular types of fluid pressure relays but rather that any such device of greater or lesser complexity might be incorporated into a computer according to the present invention.

The arrangement of relays in a laminar fashion as shown for example in FIGURE 1 generally requires that each relay plate such as 12a for example be separated from an adjacent relay plate by a sheet of material which is not perforated in the area of the relay chambers. It has been found that these sheets can be made still thinner than the relay sheets since there is no necessity for fluid flow in the plane of these partition sheets, but rather all fluid flow will be vertically through the partition sheets.

The partition sheets will normally be provided with a number of apertures to allow vertical communication through the laminations of the computer unit 51 as shown by the chanenls 15 in FIGURE 1, for example.

Figure 6:
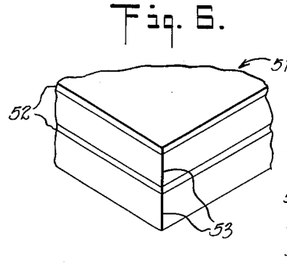
FIGURE 6 is a fragmentary isometric view of a particular construction of a laminated computer element according to the present invention.

A laminar computer unit showing the use of thin partition sheets is shown in FIGURE 6. It will be seen from FIGURE 6 that certain of the layers 53 of the computer unit are relatively thick while relatively thinner sheets 52 are provided between the layers 53. These layers 52 serve as partitions and provide a more efficient utilization of the volume of the computer.

Certain ones of the layers 53 as shown in FIGURE 6 may be relay plates comprised entirely or largely of relay units. It is necessary to also provide means for horizontal communication within the computer to interconnect the relays with one another and with vertical trunk lines or constant pressure source supply lines. Certain of the thick plates 53 shown in FIGURE 6 will therefore be utilized for horizontal communication channels. These channels may be provided simply by cutting slots from one point to another in a plate 53 and providing holes in the adjacent partition plates 52 to make communication with vertically adjacent plates.

In view of the fact that the number of relays in a computer may often run into the thousands it may be desirable to utilize a horizontal communication channel arrangement where a standardized plate is modified by a simple operation to provide a great flexibility in horizontal communication channels. Such an arrangement is shown in FIGURES 7 and 8.

Figure 7:
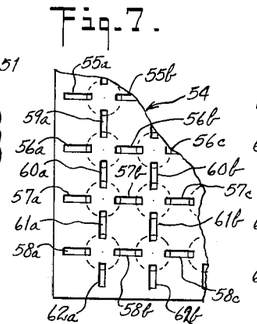
FIGURE 7 is a fragmentary top plan view of a perforated sheet for use in a communication channel arrangement in a fluid pressure digital computer according to the present invention.

In FIGURE 7 a horizontal communication plate 54 of standardized form is shown. The plate 54 is provided with a number of elongated apertures or slots 55a, 55b, 55c, etc. arranged end to end. A second, third and fourth series of such slots 56a, 56b, etc.; 57a, 57b, etc.; and 58a, 58b, etc. are provided parallel to the first series of slots. Between each of the foregoing series of colinear slots there is provided a series of equally spaced parallel slots 59a, 59b, etc.; 60a, 60b, etc.; 61a, 61b, etc.; and 62a, 62b, etc.

The slots thus provided make up a rectangular grid of interrupted channels. It will be observed that if one were to connect the slots meeting at given intersections of the grid a fluid channel could be provided from one location to another. This might be accomplished simply by punching holes in the sheet 54 in accordance with predetermined instructions. However, this may in some cases be subject to a disadvantage in that the number of channels provided in a given plate 54 would be limited due to the danger of destroying the structural integrity of the plate.

Figure 8:
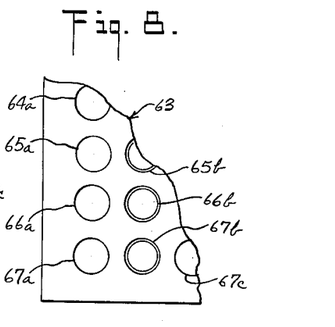
FIGURE 8 is a fragmentary top plan view of a second perforated sheet adapted to cooperate with the sheet shown in FIGURE 7 to complete a communication channel arrangement for use in a computer of the present invention.

This may be overcome to a substantial extent by providing the interconnections at the intersections of the grid of plate 54 in an adjacent plate 63 shown in FIGURE 8. It will be observed that a plate 63 having holes 64, 65, 66, and 67 may be placed adjacent a plate 54 to provide horizontal communication channels in any desired manner. The only limitation being that the channels obviously cannot cross one another since they are effectively in the same plane and hence cannot cross and still maintain their mutual isolation. The plates 63 may be punched in accordance with predetermined instructions on a punching machine or alternatively a plate 63 such as shown in FIGURE 8 may be provided wherein all the holes are punched and certain of the holes may be filled by inserting circular metal plates sized to fit snugly in the holes 65b, 66b and 67b. The latter arrangement provides the obvious advantage that many different horizontal communication networks may be created by the use of only three different structures, namely the grid plate 54, the apertured plate similar to 63 and a quantity of circular plates or blocks for filling appropriate holes as shown at 65b, 66b and 67b.

From the foregoing explanation it may be seen that various preferred embodiments of a fluid pressure digital computer have been described wherein it is possible to provide a large number of fluid pressure relays interconnected in any desired manner all within a very small volume. The manner in which such relays may be connected to provide a digital computer will now be described.

Figures 9, 10F, 10G, 10H, 10I, 10L:
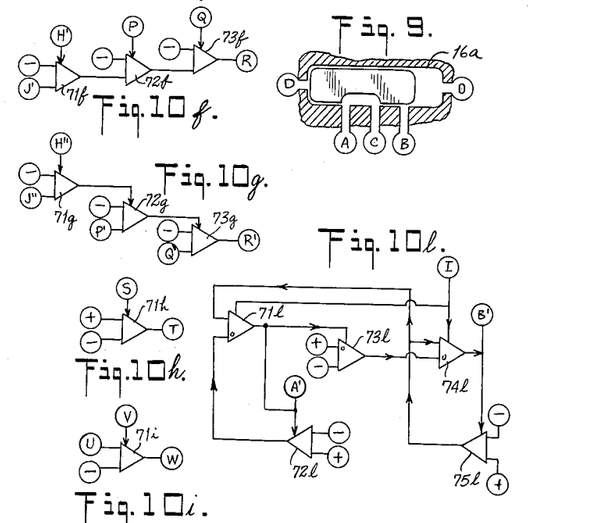
FIGURE 9 is a sectional view of a fluid pressure relay presented and marked to aid in the explanation of the various arrangements of interconnected relays shown schematically in FIGURES 10a through 10l.
FIGURE 10f is a schematic representation of a multiple logical "and" device.
FIGURE 10g is a schematic representation of an alternative type multiple logical "and" device.
FIGURE 10h is a schematic representation of a logical "inversion" device.
FIGURE 10i is a schematic representation of a logical "inhibition" device.
FIGURE 10l is a schematic representation of a fluid pressure binary counter according to the present invention.
Figure 10A:
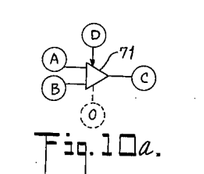
FIGURE 10a is a schematic representation of a single fluid pressure relay marked in a manner corresponding to FIGURE 9 to show the symbolism employed in the schematic drawings of FIGURES 10b through 10l.

FIGURE 9 and FIGURE 10a illustrate the symbolism employed in FIGURES 10b through 10l to show various connections of the fluid pressure relays which may be used to form the basic elements of a digital computer. In FIGURE 9 a fluid pressure relay 16a is shown which is similar to the relay of FIGURE 2. The lefthand inlet of the relay 16a is marked A, the right inlet is marked B while the valve outlet between inlets A and B is marked C. The lefthand control port is marked D and the righthand control port is marked zero (0).

A particular embodiment of the fluid pressure digital computer which is thought to be more desirable from the point of view of reliability and simplicity involves the use of three fluid pressure sources having different pressure values. These pressure sources may be termed the high pressure, low pressure and intermediate pressure sources. They will be indicated by a plus sign (+), a minus sign (−), and a zero (0), respectively.

In the preferred embodiment of the computer each pressure relay will have one of its two control ports connected to the intermediate pressure source. The other port will be arranged so that it is selectively connected to either the high or the low pressure source. In this manner, the position of the valve will be positively determined at all times. The magnitude of the pressures necessary may of course vary with the arrangement or size of the computer. Normally high pressures will not be necessary. It may be possible in some cases to utilize atmospheric pressure for one of the pressures of the system. It will be noted in FIGURE 9 that the right-hand control inlet is connected to the intermediate pressure source as indicated by the numeral zero.

Referring now to FIGURE 10a, a schematic representation of a fluid pressure relay is shown at 71. The lefthand inlet is marked A and the righthand inlet is marked B in correspondence with the marking of FIGURE 9. The outlet of the relay is marked C also in correspondence with FIGURE 9. The lefthand control port is marked D and the righthand control port is marked 0, further corresponding with the markings of FIGURE 9.

In both FIGURE 9 and FIGURE 10a if a high pressure is supplied to port D then port B is connected to port C. On the other hand, if a low pressure is supplied to port D then port A is connected to port C. The symbolism of FIGURE 10a will be utilized throughout FIGURES 10b through 10l, although different letters will be used to distinguish ports of different relays.

Figure 10B:
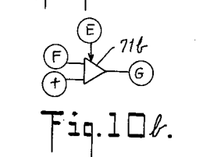
FIGURE 10b is a schematic representation of a logical "or" device.

Referring now to FIGURE 10b, a fluid pressure relay 71b is shown connected to provide a logical "or" circuit. The "or" circuit has two inputs and a single output and is designed to provide a first type of signal if neither of the inputs is furnished with a predetermined signal and is designed to furnish a second type of output signal if one or both of the inputs are furnished with the predetermined signal. The relay connection of 71b provides such a device as it is obvious that a positive signal supplied at E or F will provide a positive output at G, that is if E is positive the positive source connected to the relay input will be connected to port G and thus provide a positive output. If F is positive both inputs to the relay will be positive and thus the output G must necessarily be positive.

Figure 10C:
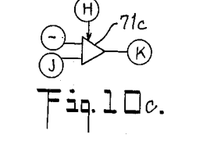
FIGURE 10c is a schematic representation of a logical "and" device.

FIGURE 10c shows a logical "and" circuit 71c. A logical "and" circuit operates to provide a distinctive output signal if and only if both of its two inputs have a particular predetermined signal supplied. It will be observed in FIGURE 10c that if the relay 71c is provided with a negative input at either H or J the output K will be negative, and only when both H and J are positive will the output K be positive. The connection of the relay 71c therefore provides a device to perform the logical "and" operation.

Figure 10D:
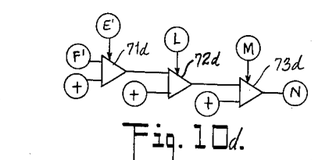
FIGURE 10d is a schematic representation of a multiple logical "or" device.

FIGURE 10d shows a multiple logical "or" device consisting of relays 71d, 72d and 73d. The arrangement of FIGURE 10d is in effect simply a tandem arrangement of logical "or" devices as shown in 10b. Relay 71d is connected substantially as was relay 71b in FIGURE 10b. Thus a positive output at either of the "or" inputs F' or E' produces a positive output from the relay 71d. The output from the relay 71d is supplied to an input of relay 72d and a third "or" device input is supplied at L. A third relay 73d is connected to receive the output of relay 72d and thus provides a fourth "or" device input at M. The output N of the multiple "or" device will thus be positive if any one of the "or" device inputs F', E', L or M is positive.

Figure 10E:
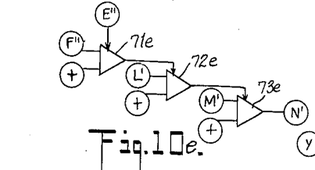
FIGURE 10e is a schematic representation of an alternative multiple logical "or" device.

An alternative multiple logical "or" arrangement is shown in FIGURE 10e. The three relays 71e, 72e, 73e are arranged in tandem similar to those of FIGURE 10d except that the output of the preceding relays is fed to the control port of the succeeding relay rather than to an inlet port as shown in FIGURE 10d. The result is obviously the same in that a positive input to F'', E'', L' or M' will result in a positive output from the "or" device output N'.

A multiple logical "and" device is shown in FIGURE 10f. As in the case of the multiple "or" device, the relays 71f, 72f and 73f are essentially "and" devices connected in tandem to provide a multiple "and" device. It will be observed that the relay 71f is connected substantially as was relay 71c in FIGURE 10c. The output of the relay 71f is fed to an inlet port of the relay 72f and a second input to the multiple "and" device is provided by the control port connection P. The third relay 73f is similarly connected to receive the output from the relay 72f and a fourth "and" circuit input is provided at Q. The output of the "and" circuit R will thus be negative in every case except where all of the inputs H', J', P and Q are positive.

FIGURE 10g shows an alternative multiple "and" arrangement where the relays 71g, 72g and 73g are arranged in tandem in a manner previously seen in FIGURE 10e. Thus the arrangement of FIGURE 10g provides a positive output at R' if and only if the inputs at H'', J'', P' and Q' are positive.

The purpose of the inversion arrangement 71h shown in FIGURE 10h is simply to provide an output of opposite sign to that of the input. This is accomplished by the connection of the inlet ports of relay 71b to positive and negative pressure sources and the connection of the input S to the control port. An output T is thus provided which is opposite in sign to that of the input.

FIGURE 10i shows an inhibition element to provide an output equal to that of one of its inputs except in the case where its second input is provided with a particular predetermined signal, in which case the output is constant and not affected by the signal at the first input. To provide this operation the relay 71i has a first input U which may be inhibited by an inhibitor input V. The input U is connected to the lefthand inlet of the relay 71i and a negative pressure source is connected to the righthand inlet of the relay 71i. The input V is connected to the control port of the relay 71i. Thus the output W of the inhibition element 71i is equal to the input U except where a positive input is supplied at V in which case the output W is negative.

Figure 10J:
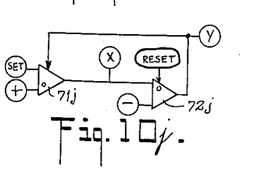
FIGURE 10j is a schematic representation of a fluid pressure "flip-flop" device according to the present invention which is "set" dominant.

A slightly more complicated operation is provided by a "flip-flop" element in a digital computer. The relay 71j and 72j in FIGURE 10j is arranged to provide a "flip-flop" element. A "flip-flop" is a bistable device having two input signals in which a particular signal at first of the input channels causes the device to assume the first of its stable conditions, while a particular signal at the second input channel causes the device to assume the second of its stable conditions. After the "flip-flop" has been actuated by an input signal the removal of the signal produces no effect on the device and it will remain in a stable condition until it is actuated by a signal from the opposite channel.

In FIGURE 10j the input channels to the "flip-flop" are labelled "set" and "reset." The set channel is connected to the lefthand inlet of relay 71j and the righthand inlet of relay 71j is connected to a positive pressure source. The output of the relay 71j is connected to the lefthand inlet of the relay 72j, while the righthand inlet of the relay 72j is connected to a negative fluid pressure source. The reset channel is connected to the control port of the relay 72j. The outlet of the relay 72j is connected to the control port of the relay 71j.

One output of the "flip-flop" of FIGURE 10j is shown connected to the output of the relay 71j at X. A second output for the "flip-flop" is connected to the outlet of relay 72j at Y. The output at X is set dominant while the output at Y is reset dominant. In other words, if positive pulses are applied to both set and reset channels, the X output will be affected in the same manner as if a positive signal had been supplied only to the set channel. Conversely, where positive signals are applied to both input channels the Y output will be affected as if a positive signal had been applied only to the reset channel.

In order to explain the operation of the device of FIGURE 10j, let it be assmed that a positive signal is applied to the set channel of relay 71j, while a negative signal is applied to the reset channel of the relay 72j. It will be noted that the negative reset signal will cause relay 72j to establish a connection between the inlet connected to X and the outlet connected to Y. It will further be noted that since the signal to the set channel of relay 71j is positive and the signal to the other inlet of relay 71j is also positive, the output of relay 71j must be positive. This signal is transmitted through the relay 72j as previously explained and is returned to the control port of relay 71j causing relay 71j to connect the positive fluid pressure source to the output of relay 71j.

It will therefore be observed that relay 71j is oriented to close off the set channel, and hence changes in the signal applied to the set channel cannot affect the "flip-flop" arrangement of FIGURE 10j at this time. It is obvious that the signal at X and the signal at Y are both positive for the conditions set forth above.

Assume then that the signal applied to the set channel becomes negative. As pointed out above, this will produce no effect on the arrangement of either of the relays nor on the pressure values within the network. Both X and Y will remain positive.

If the signal applied to the reset channel now becomes positive, the relay 72j will operate to connect the negative pressure source to the outlet of relay 72j and hence to the output Y and the control port of relay 71j. The negative signal applied to relay 71j will cause the relay 71j to interconnect the set channel and the output of relay 71j, thus connecting the negative pressure signal of the set channel to the output X and to the lefthand inlet of relay 72j. Thus the positive pulse on the reset channel in conjunction with a negative signal on the set channel will cause both X and Y outputs to change from positive to negative.

It will be observed from the above explanation that once the "flip-flop" has been activated by a positive signal on the set channel it is not affected by changing the set channel to negative. However, a positive signal applied to the reset channel in the absence of a positive signal on the set channel reverses the condition of both the X set dominant output and the Y reset dominant output.

The above sequences of operations and further exemplary sequences in operations are shown in Table I below.

TABLE I

|     | Set | Reset | X | Y |
| --- | --- | --- | --- | --- |
| 1   | +   | −   | + | + |
| 2   | −   | −   | + | + |
| 3   | −   | +   | − | − |
| 1a  | +   | −   | + | + |
| 2a  | +   | +   | + | − |
| 3a  | −   | +   | − | − |
| 1b  | +   | −   | + | + |
| 2b  | +   | +   | + | − |
| 3b  | +   | −   | + | + |

Referring to steps 1a, 2a and 3a, in the above table, the first step 1a is the same as step 1 previously explained. In step 2a positive pulses are supplied to both inputs. At the set cominant output X the change from 1a to 2a should have no effect since positive pulses on both inputs should affect output X in the same manner as a positive pulse on the set channel alone.

Referring to the table, it will be noted that this is the case. For the reset dominant output Y however a positive pulse on both channels should produce the same effect as a positive pulse on the reset channel alone. A positive signal on the reset channel alone should cause the condition of the "flip-flop" to be reversed. It will be noted in the Y column of Table I that this is indeed the case.

Referring now to step 3a in Table I a negative signal is now applied to the set channel while a positive signal is retained on the reset channel. For output X, the change from both inputs positive to reset only positive obviously should cause a reversal of signal from positive to negative, and such is the case. For the Y output, however, the positive signal on the reset channel alone should appear the same as the previous positive signals on both channels and thus no change of condition should result. Reference to column Y in step 3a indicates that this is the case.

The first two steps 1b and 2b of the next sequence are the same as before. In the third step, however, the positive signal on the set channel is retained, while the signal on the reset channel is changed from positive to negative. The set dominant output X should be unaffected by step 3b since positive signals on both channels should appear the same as a positive signal on the set channel only. In column X it will be noted that no change occurs. For the reset dominant output Y a change should be produced, however, since step 2b had the same effect as a positive signal on the reset channel only, while step 3b produces a positive signal on the set channel only. It will be noted in column Y that a reversal of signal is indeed produced in conformance with this scheme. Other exemplary signal combinations could be derived by reversing the set and reset columns and simultaneously reversing the X and Y columns in Table I.

It should be noted that FIGURES 10a through 10i represent devices adapted for operation on continuous signals. That is, the outputs of the devices of 10a through 10i are determined solely by the inputs concurrently applied to the devices. The previous inputs to the foregoing devices produce no effect on the output. On the contrary it will be noted that the device of FIGURE 10j and the devices of the following figures produce an output which is in part dependent on previous inputs to the device. The device of FIGURE 10j and the devices in the following figures are therefore particularly adapted for use with pulse signals as well as with continuous signals. It is of course well known that the logical elements of FIGURES 10a through 10i may be combined to produce devices suitable for pulse operation also.

Figure 10K:
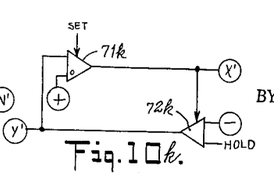
FIGURE 10k is a schematic representation of a fluid pressure "flip-flop" device according to the present invention which is "reset" dominant.

FIGURE 10k shows a bistable "hold" device comprising interconnected fluid pressure relays 71k and 72k. The device of FIGURE 71k has two inputs, a "set" input and a "hold" input. It is the function of a hold device to cause a signal applied to the set channel to be held by a signal on the hold channel until such time as the signal on the hold channel is removed at which time the device is to return to a predetermined condition. Two outputs are shown for the hold device. Output X' is set dominant, while output Y' is hold dominant.

The hold channel shown in FIGURE 12k is connected to the lefthand inlet port of relay 72k while the righthand inlet port is connected to a negative pressure source. The outlet of relay 72k is connected to the lefthand inlet port of relay 71k and to hold dominant output Y'. The righthand inlet port of relay 71k is connected to a positive pressure source. The set channel is connected to the lefthand control port of relay 71k. The output of relay 71k is connected to the righthand control port of relay 72k and to set dominant output X'.

The operation of the hold device of FIGURE 10k may be derived in the manner previously shown with respect to FIGURE 10j. Examples of the operation of the device of FIGURE 10k are shown in tabular form in Table II below. It will be noted from steps 1, 2 and 3 in Table II that a positive signal at the set channel produces a positive output at X' and that when a positive signal is applied to the hold channel the positive signal at X' is retained even when the signal on the set channel is changed to a negative signal. It will be noted that a positive signal on the set channel and a negative signal on the hold channel are in a sense contradictory in the same manner that positive signals on both channels are contradictory in FIGURE 10j. The X' output is set dominant and thus a positive signal on the set channel together with a negative or release signal on the hold channel produces a positive output at X' as if the negative hold or release signals were not present. However, at Y', the hold dominant output, a negative hold or release signal produces a negative output regardless of the signal at the set channel. This will be noted at step 1 column Y'.

The further examples of the operation of the device of FIGURE 10k are believed to be self-explanatory and demonstrate that the device may be utilized as a hold element which is either set or hold dominant.

TABLE II

|    | Set | Hold | X' | Y' |
|----|-----|------|----|----|
| 1  | +   | −    | +  | −  |
| 2  | +   | +    | +  | +  |
| 3  | −   | +    | +  | +  |
| 1a | +   | −    | +  | −  |
| 2a | −   | −    | −  | −  |
| 3a | −   | +    | −  | −  |
| 1b | +   | −    | +  | −  |
| 2b | +   | +    | +  | +  |
| 3b | +   | −    | +  | −  |
| 1c | +   | −    | +  | −  |
| 2c | −   | −    | −  | −  |
| 3c | +   | −    | +  | −  |

FIGURE 10l shows a binary counter comprising five interconnected fluid pressure relays 71l, 72l, 73l, 74l, and 75l. The device of FIGURE 10l is adapted to receive a sequence of signals and to produce a different sequence of signals wherein the number of complete cycles from positive to negative and back to positive produced at the output is one-half the number of cycles received at the input.

The relay 72l in FIGURE 10l has its righthand inlet port connected to a negative pressure source and its lefthand inlet port connected to a positive pressure source. The outlet of relay 72l is connected to the righthand inlet of relay 71l. The outlet of relay 71l is returned to the control port of relay 72l, to an output A', and also to the control port of relay 73l. The relay 73l is connected to provide an inversion device (as shown in FIGURE 10h). The outlet of the relay 73l is connected to the righthand inlet of the relay 74l. The outlet of the relay 74l is connected to the control port of the relay 75l, and to an output B'.

The relay 75l has its righthand inlet port connected to a negative pressure source and its lefthand inlet port connected to a positive pressure source. The outlet of relay 75l is connected to the lefthand inlet port of the relay 74l and the lefthand inlet port of the relay 71l. The input of the binary counter of FIGURE 10l is shown at I. This input is connected to the control port of relay 71l and the control port of relay 74l.

In order to explain the operation of the binary counter let it first be assumed that a positive signal is supplied at the input I, and let it further be assumed that the signal at A' is negative, that is, that the relay 72l is actuated to connect the negative fluid pressure source through the relay 71l back to the control port of the relay 72l. With these conditions assumed it will be seen that the output of the inversion relay 73l will be positive and that this output will be transmitted through relay 74l so that the output B' is positive.

If it were assumed that A' is negative, it will be seen that the operation of the inverter of relay 73l will cause the signal at B' to be positive. Assume now that the input at I is negative. It will now be observed that the relay 74l and the relay 71l will be oriented to connect their lefthand inlet ports to their respective outlet ports. In this case the signal existing at B' which is determined by the orientation of relay 75l, will then control the signal at A'. The signal from the relay 75l which is of the same sign as the signal at B' is transmitted through the relay 71l directly to A'. Since the signal does not pass through the inverter 73l in this direction, A' will be controlled by B' to have the same sign as B'. The foregoing conditions of operation of the binary counter are summarized below.

If I is +, and A' is −, then B' is +.
I is +, and A' is +, then B' is −.
I is −, and B' is +, then A' is +.
I is −, and B' is −, then A' is −.

The operation of the binary counter will now be explained with reference to the above summary.

Assume I is + and A' is −, then B' is +;
then if I becomes −, since B' is +, A' becomes +;
if I becomes +, since A' is −, B' becomes −;
if I becomes −, since B' is −, A' becomes −;
if I becomes +, since A' is −, B' becomes +; etc.

From the foregoing explanation it will be obvious that for every two reversals in the sign of I, one reversal in the sign of either A' or B' is produced. In other words, for every complete two cycles of I, one complete cycle is produced at A' or B'.

Figure 16:
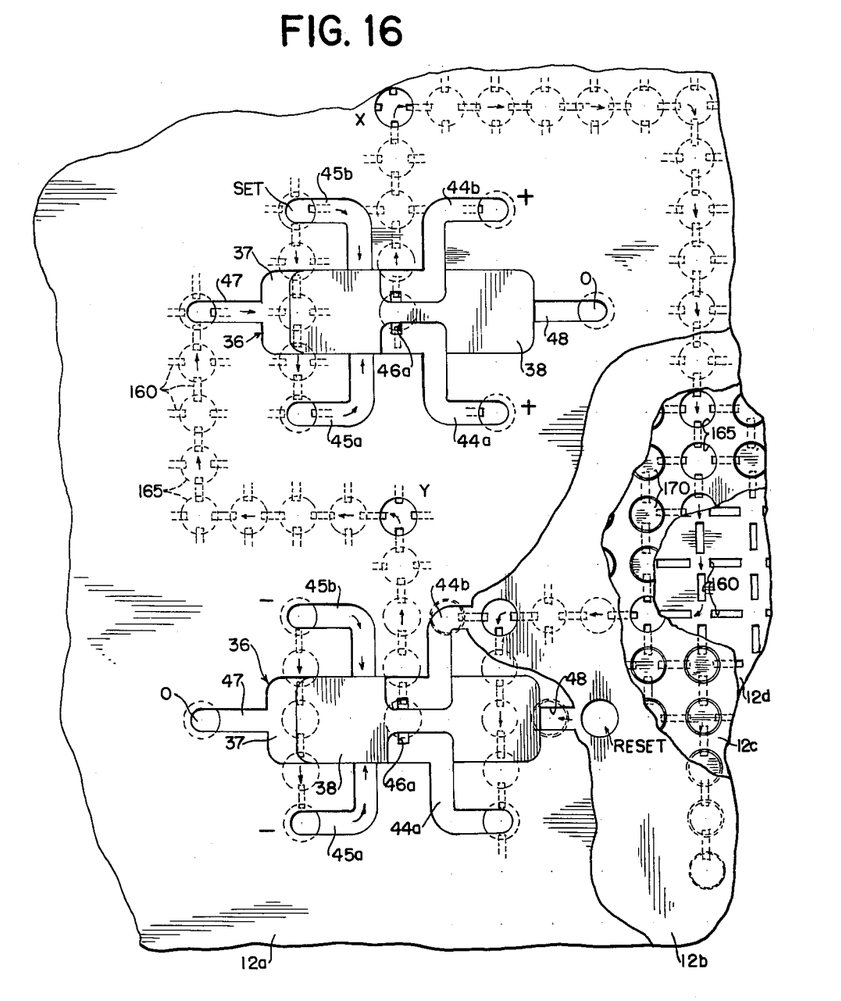
FIGURE 16 is a fragmentary top plan view of a laminated form of computer construction according to the present invention.

FIGURE 16 serves to relate the various basic forms of fluid pressure relays shown schematically in FIGURES 10a through 10e with the physical structure of relays and interconnecting channel structure illustrated in FIGURES 1, 4, and 6 through 8.

FIGURE 16 shows the interconnection of the logic unit of FIGURE 10i implemented in physical form in accordance with FIGURES 1, 4, and 6 through 8. For conveninence, the various elements illustrated in FIGURE 16 are generally given the same reference numerals as in the previous figures. The fluid pressure relay 36 in FIGURE 4 is utilized as the fluid pressure relay element in FIGURE 16 and its structure and operation are the same as that previously described. The reference numerals applied to relays 36 in FIGURE 16 are generally the same as those in FIGURE 4.

It will be noted that the structure illustrated in FIGURE 16 comprises four illustrated layers or laminations. The structure obviously also comprises a superjacent and a subjacent lamination which would generally be unperforated except at the location of transverse trunk lines utilized to supply positive, negative and intermediate pressures for powering the relays and also for interlaminar communication. Illustration of such trunk lines is unnecessary for the purpose of explanation of the structure of FIGURE 16, and for simplicity they have been omitted from the drawing.

The uppermost lamination 12a in FIGURE 16 is cut out to form a chamber for each fluid pressure relay 36 and to form six channels leading to the chamber.

Second lamination 12b is for the most part solid and forms a wall for the chambers 37 of fluid pressure relays 36. Elongated openings 46a are provided in lamination 12b as output ports for the fluid pressure relays. Openings are also cut in lamination 12b at the end of each of the six channels leading from respective fluid pressure relays 36; this serves to conduct fluids and fluid pressure signals into the subjacent layers which are the interconnecting layers.

Third lamination 12c is uniformly perforated with circular openings in a rectangular grid. A few (but not all) of such openings are indicated in dotted lines in FIGURE 16 to clarify and simplify the presentation.

Openings 165 in lamination 12c cooperate with a grid of elongated rectangular apertures 160 in lamination 12d to provide lateral communication channels within the laminations 12c and 12d, as explained previously with reference to FIGURES 7 and 8. Summarizing that explanation briefly, it will be observed that circular plugs 170 are provided in some, in fact in most, of the circular openings 165 so that communication is blocked within the two laminations 12c and 12d except where it is desired to interconnect particular openings in the lamination 12b.

In FIGURE 16, communication has been provided between the two fluid pressure relays to form a flip-flop logic unit as illustrated schematically in FIGURE 10i. The uppermost fluid pressure relay 36 in FIGURE 16 corresponds to left-hand fluid pressure relay 71j in FIGURE 10i, and the lowermost relay 36 in FIGURE 16 corresponds to the right-hand fluid pressure relay 72j in FIGURE 10i.

In FIGURE 16 as in FIGURE 10i, the legends X, Y, Set, Reset, Zero, Plus and Minus, are utilized to indicate the function of the various ports of the fluid pressure relays. The operation of the flip-flop logic unit is, obviously, the same as that described with reference to the schematic illustration of FIGURE 10i.

Interconnections between the fluid pressure relays in FIGURE 16 are indicated by arrows, it being understood that the paths indicated will be left open by omission of plugs 170 and isolation between these various interconnecting channels will be assured by the presence of plugs 170 in intervening openings 165, all as explained with reference to FIGURES 7 and 8.

While the illustration of FIGURE 16 directly represents the logic element of FIGURE 10i, it may be noted that FIGURE 16 may also be considered to represent such a logic element which forms a part of a much more complex device, such as the computer of FIGURES 11 through 15, or even more complicated structures. It is obviously impractical to illustrate in detail (such as in FIG. 16) all the interconnections of the computer of FIGS. 11 through 15; such detail would be unnecessary in any case, since it is a matter of routine to translate the schematic diagrams into a physical form.

From the foregoing examples of computer elements presented it will be obvious to those skilled in the art that a computer of any desired complexity may be assembled, from the elements presented in FIGURES 10b through 10l. Representative organizations of such elements to provide a digital computer are shown in textbooks on the digital computer art, such as "Arithmetic Operations in Digital Computers," published by D. Van Nostrand, 1955. The method of assembling computers utilizing steady state techniques is shown, for example, on pages 84 to 88, 114 and 139 of the above text. Computers may also be constructed using the foregoing elements and utilizing pulse techniques as is shown in the above text at pages 101, 124, 195, and others.

It will be obvious that the nature of the present computer makes it particularly well suited for binary digital operation. The elements or the arrangement of elements could, however, be adapted to provide a digital computer of other than the binary type.

Although many manners by which the basis computing elements shown herein may be combined to produce a computer are within the ability of one of ordinary skill in the art, a particular arrangement of the basic elements to produce a simple computer is presented by way of illustration in FIGURES 11 through 15. In FIGURES 11 through 15 a schematic diagram is shown illustrating the connection of the basic elements previously described to provide a computing arrangement of exceptional simplicity and efficiency.

For the purpose of illustration the computer shown has a binary input and a binary output. Obviously the computer could be modified to provide a decimal input and decimal output in accordance with known practice in the art. Furthermore, the computer presented by way of illustration is limited to five binary digits for simplicity and is adapted to perform only the operation of addition. The computer could obviously be enlarged to a more practical capacity simply by the extension of the scheme shown in FIGURES 11 through 15. The invention is not limited in any respect to the computer shown in FIGURES 11 through 15, it being understood that computers of great complexity could be constructed by the application or ordinary skill derived, for example, from the electronic digital computer art to the basic invention disclosed here.

Figures 9A, 10M, 11:
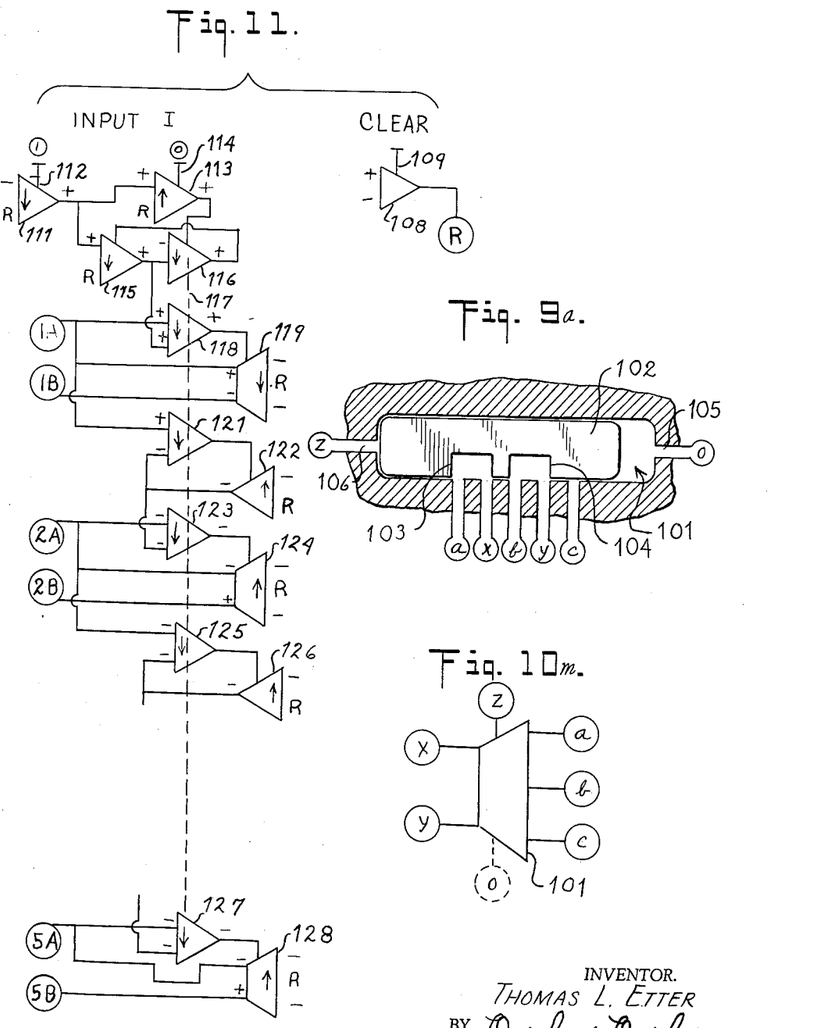
FIGURE 9a is a sectional view of a double-valve type fluid pressure relay useful in certain applications.
FIGURE 10m is a schematic diagram of the device of FIGURE 9a marked to conform to FIGURE 9a and to illustrate the symbolic or schematic representation of the relay of FIGURE 9a utilized in FIGURES 11 through 15.
FIGURE 11 is a schematic diagram of a keyboard and shift register section of a computer according to the present invention. The keyboard and shift register section of FIGURE 11 is adapted to cooperate with further sections shown in FIGURES 14 and 15 to form a computer illustrative of the present invention.

Referring now to FIGURE 11, in this figure is shown one of the two digital inputs and shift registers forming a part of a fluid pressure digital computer. FIGURE 11 utilizes the symbolism employed and explained in connection with FIGURE 10a and in addition employs one symbol not previously explained.

The new symbol represents a double relay found to be particularly useful in constructing a computer according to the present invention. Such a relay is illustrated in FIGURE 9a. The double relay 101 has an armature 102 which is provided with two indentations 103 and 104. The relay is provided with control ports 105 and 106 similar to those previously explained in connection with the explanation of the single relay. The lefthand control port 106 is shown connected to a fluid pressure channel z while the righthand control port 105 is shown connected to an intermediate pressure source marked 0. As in the case of the single relays previously explained, it is preferred that one control port of the relay 101 be connected to an intermediate pressure source at all times. The position of the armature 102 is therefore controlled by the pressure supplied in the fluid pressure channel z which may either be a high pressure or a low pressure.

The indentations 103 and 104 serve to connect output channel x with either input channel a or b and to connect output channel y with either channel b or c.

Where relay 101 is utilized in FIGURES 11 through 15 the symbolism employed is that illustrated in FIGURE 10m. In FIG. 10m the various channels are indicated by the same letters used in FIGURE 9a. Thus in FIGURE 10m it will be observed that if a positive pressure is applied to the control channel z, input channel b will be connected to output channel x, while input channel c will be connected to output y. This operation corresponds to that of the physical structure shown in FIGURE 9a. Obviously a negative pressure applied to channel z will result in input channel a being connected to output channel x, while input channel b is connected to output channel y.

Figure 14:
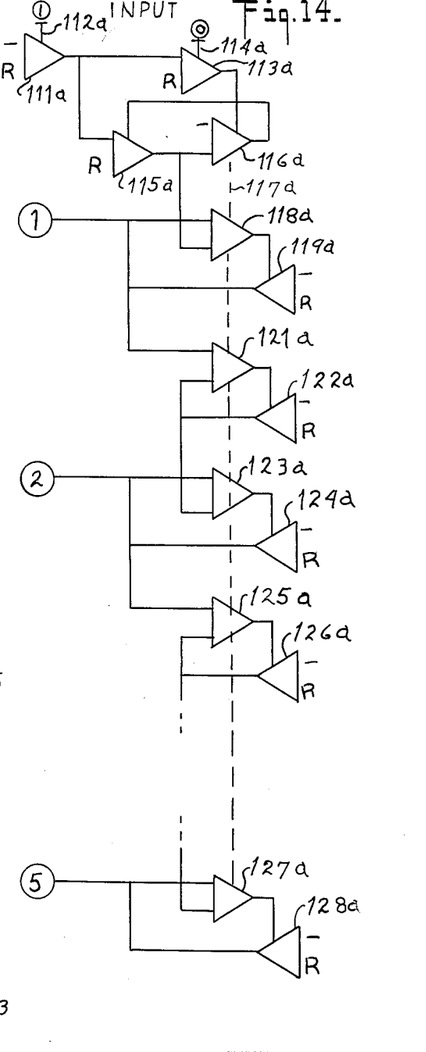
FIGURE 14 is a schematic diagram of a second keyboard and shift register section of an illustrative computer device according to the present invention.
Figure 15:
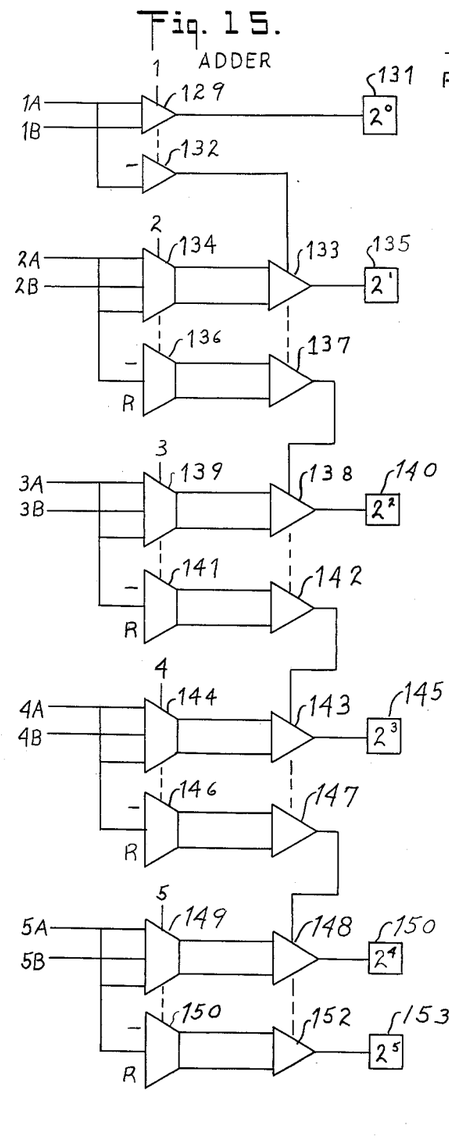
FIGURE 15 is a schematic diagram of a binary adder section for a computer device illustrative of the present invention.

Having explained the symbolism employed in FIGURE 10m the operation of FIGURE 11 may be described. FIGURE 11 shows one input together with a shift register so that digits entered one at a time will be shifted from one place to another in the shift register and stored therein. A second similar input and shift register is shown in FIGURE 14, while an adder is shown in FIGURE 15. The two shift registers are connected to the input of the adder so that entries made in the two inputs will be added and indicated by the adder.

The shift register of FIGURE 11 is illustrated with a capacity of five binary digits. The shift register in FIGURE 11 is arranged to have both a positive and negative output for each place in the five digit number. Having a positive and negative output in the shift register of FIGURE 11 simplifies the construction of the adder shown in FIGURE 15. The "ones" place outputs are indicated at 1A and 1B. The "twos" place outputs are indicated at 2A and 2B, etc.

A relay 111 is provided with a key 112 for selecting the position of the armature of the relay. The relay 111 is the "1" key relay. To enter a "1" into the shift register shown in FIGURE 11 it is therefore necessary to depress the key 112, which would normally be spring or pressure loaded, to its upward position. Obviously instead of the key control relay 111 the input for the relay 111 could be by means of fluid pressure from a remote source.

A similar key controlled relay is shown at 113. The key 114 of the relay 113 is the "0" key. Entry of a "0" in the shift register is therefore accomplished by the depression of the key 114. Numbers written in binary notation contain only the numerals 1 and 0. Such numbers may be entered into the shift register of FIGURE 11 by depression of the keys 112 and 114. As an example, the number 20 (decimal notation) written in binary notation is 10100. To enter this number in the register of FIGURE 11 it would be necessary to depress key 112 one time, then depress key 114 one time, again press key 112 one time, and finally depress key 114 two times. Entry of numbers into the shift register is therefore accomplished in a manner similar to that employed in entering numbers into the familiar 10 key desk calculator keyboard.

A further key operated relay 108 is provided to clear the computer of all numbers stored therein. This is accomplished by depressing the clear key 109 of relay 108. For simplicity in the schematic diagrams 11 through 15 all connections to the clear or reset channel are indicated by R. It will obvious that since relay 108 is required to simultaneously operate a substantial number of other relays it should either be a special relay of somewhat larger capacity or else be composed of a number of standard relays connected in parallel.

The "1" relay 111 has its righthand inlet connected to receive the output of the clear relay 108. This channel indicated by the letter R will hereafter be referred to as the reset channel. The lefthand inlet of the relay 111 is connected to a negative fluid pressure source. The output of the relay 111 is connected to the lefthand inlets of relays 113 and 115, respectively. Relay 115 is the keyboard output relay. The outlet port of relay 113 is connected to the control port of a relay 116.

The relay 116 is a keyboard actuation relay. The output of relay 116 is connected to the control port of the keyboard output relay 115. The output of the relay 115 is connected to the righthand inlet port of the relay 116 and also to the righthand inlet port of a relay 118.

The relay 118 is the "ones" section input relay. The lefthand inlet port of the relay 118 is connected to the "ones" section positive output 1a. The output of the relay 118 is connected to the control port of a double relay 119. The right and lefthand outputs of the relay 119 are connected, respectively, to the positive and negative outputs 1A and 1B of the "ones" section of the shift register.

The transfer sub-section of the "ones" section of the shift register is composed of relays 121 and 122. The relay 121 being the transfer input relay and the relay 122 being the transfer output relay. The lefthand inlet port of the relay 121 is connected to the "ones" section positive output 1A. The output of the relay 121 is connected to the control port of the relay 122. The righthand inlet port of the relay 122 is connected to a negative fluid pressure source. The lefthand inlet port is connected to the reset channel. The output of the relay 122 is connected to the righthand inlet of the relay 121. The outlet of the output relay 122 is also connected to the righthand inlet of a "twos" section input relay 123.

The "twos" section of the shift register is composed of input relay 123, output relay 124, transfer input relay 125, and transfer output relay 126. These relays correspond to similar relays in the "ones" section of the shift register and are connected in the same manner.

The left and right inlet ports of the double relay 119 are connected to a negative fluid pressure source while the center inlet port of the relay 119 is connected to the reset channel.

It will be observed that the relays 116, 118, 121, 123 and 125 and corresponding relays in other sections are connected for common actuation as indicated by the dotted line 117. This may be accomplished by connecting the fluid pressure control ports of these relays to a common fluid pressure channel. Alternatively a large relay having multiple outputs and inputs may be utilized as previously suggested. For simplicity the third and fourth sections of the shift register are omitted in view of the fact that they are identical to the first and second sections.

The fifth section which would carry the fifth digit (that is, the "sixteens" digits) is shown and is composed of input relay 127 and output relay 128 connected in a manner corresponding to that described with relation to the first two sections of the shift register. The fifth section obviously does not require a transfer subsection.

FIGURE 11 is marked to indicate the position of the various elments upon the depression of the "1" key 122. It should be understood, however, that preliminary to entering a number into the computer the previous numbers would be removed from all sections of the computer by depressing the clear key 109. It will be noted that the reset channel R controlled by the clear key normally carries a positive fluid pressure signal. This signal is changed to a negative signal by depression of the clear key. It will be noted from FIGURE 11 that the constant fluid pressures supplied to the computer section are negative with the exception of those pressures supplied by the reset channel. Thus when the reset channel is made negative, all constant pressures supplied to the shift register and keyboard input are negative. By reference to the keyboard section comprising relays 111, 113, 115 and 116, it will be noted that when the clear key is released returning the reset signal to positive, all fluid pressures in the keyboard section will remain negative due to the fact that the "1" key 112 and the "zero" key 114 are not depressed and thus the relays 111 and 113 do not communicate the positive reset signal to the keyboard section. The relay 115 is likewise oriented to block this reset channel.

Therefore, in considering the operation of the "1" key 112 to enter a digit of a number into the shift register, it will be understood that all fluid pressures in the keyboard section will be negative preliminary to this step. The effect of depressing the "1" key 112 is indicated in FIGURE 11. Relay 111 is oriented to communicate the positive reset signal to the output of relay 111. This pressure is communicated to the lefthand inputs of relays 113 and 115. Both inputs of relay 113 being positive, the output also becomes positive orienting relay 116 to its downward position, as indicated. All other relays 118, 121, 123, 125, and 127 which are coupled to move with relay 116 are likewise oriented to the downward position as indicated by the arrows. Since the positive output of relay 115 is communicated through relay 116 due to the orientation of this relay all fluid pressures in the channels of the keyboard section are positive and the output of the keyboard section to input relay 118 of the "ones" section of the shift register is also positive.

The condition of the "ones" section preliminary to the depression of the "1" key 112 may be derived from a consideration of the operation of the reset signal upon the "ones" section of the shift register. Depressing the clear key renders all the pressures supplied to the "ones" section negative. When the clear key is released, a negative pressure will be supplied to all points except negative "ones" output 1B. (The relay 119 having been oriented to its upward position by the all-negative-pressure condition of the "ones" section). It is therefore seen that the clear key operates as would be expected to render the positive output of the "ones" section (and also of the other sections) in a negative condition thus indicating a "zero" output for the entire shift register.

Considering now the effect of the depression of the "1" key upon the "ones" section of the shift register, it will be seen that a positive signal is supplied to the righthand inlet port of the relays 118. As previously explained, the depression of the "1" key causes the armature of relay 118 to be oriented downward thus connecting the righthand inlet port to the output of relay 118 and to the control port of relay 119. The positive pressure supplied thereby to the control port of relay 119 causes its armature to be moved downward. It will be noted that the relay 119 is the output relay for the section and orienting its armature downward causes a positive output at 1A and a negative output at 1B, indicating the presence of the numeral "1" in the "ones" section of the shift register.

While the "1" key is depressed no effect will be produced in the "ones" transfer sub-section due to the fact that the relay 121 will be oriented to a downward position blocking the signal from output 1A supplied to the lefthand port of relay 121. The only effect produced in subsequent sections of the shift register will be the movement of the armatures of the coupled relays 123, 125 and 127. Since both inputs of these coupled relays are supplied with negative fluid pressure signals, no change in the signal within the following sections will be produced.

Figure 12:
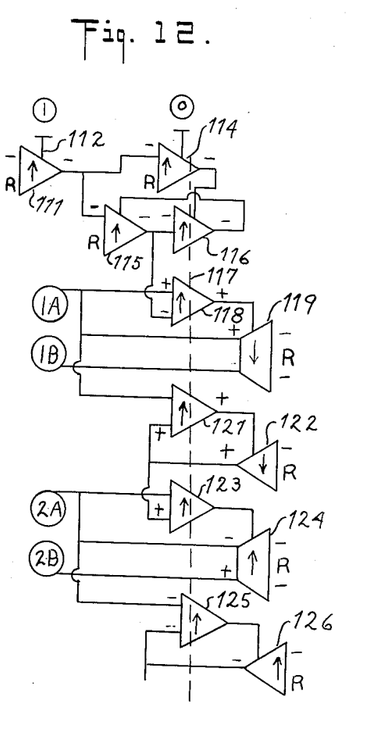
FIGURE 12 is a schematic diagram of the device of FIGURE 11 marked to show a succeeding step in the operation of the device of FIGURE 11 to aid in the explanation of the operation of the device.

The remainder of the operation of entering the number "1" in the first section of the shift register is illustrated in FIGURE 12. In this figure, the positions of the various relays and the pressure values in the various channels are indicated for the condition of the shift register which is attained when the "1" key 112 is released thus allowing the armature of the relay 111 to move to its upward position. It will be noted that at this time a negative pressure signal is supplied to the output of relay 111 and accordingly all fluid pressures in the keyboard section are changed to negative values.

The relay 116, together with the relays 118, 121, 123, 125 and 127, have their armatures restored to the upward position. The relay 118 being oriented to disconnect the input from the keyboard section, the output of the "ones" section of the shift register is thus not affected by the release of the "1" key 112.

It will be noted, however, that the act of releasing the "1" key operates the "ones" section transfer input relay 121 and thus causes the output relay 122 of the transverse sub-section to be moved to connect the reset channel (which is positive) to the input of the succeeding "twos" section of the shift register. The input to the "twos" section of the shift register is closed however by the input relay 123 so that the "twos" section output is not yet affected. Further sections of the transfer register are not affected by the release of the "1" key.

It will be observed from the foregoing description that depression and release of the "1" key 112 casues a one to be entered in the top section of the shift register and also to be entered in the top transfer sub-section of the shift register. No changes are made in the succeeding portions of the shift register.

Figure 13:
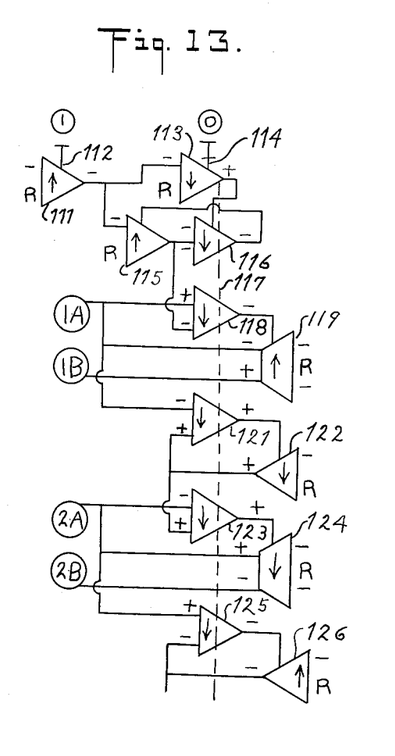
FIGURE 13 is a schematic diagram of the device of FIGURE 11 marked to show a still further step in an illustrative sequence of operations.

FIGURE 13 illustrates the insertion of a second digit into the shift register. For purpose of illustration, it is assumed in FIGURE 13 that the second digit to be entered into the shift register is a "zero." Accordingly, the "0" key 114 is depressed in FIGURE 13 and the orientation of the relays and pressure values are marked accordingly.

It will be observed that depression of the "0" key 114 causes a shifting of the coupled relays 116, 118, 121, 123, 125 and 127. However, a depression of the "0" key does not render the output of the keyboard section positive but rather the output remains negative. This negative output causes the relay 119 to be oriented to its upward or "zero" position. The output of the "ones" section of the shift register therefore is changed to a "zero" output. The depression of the "0" key 114 also causes the positive signal registered in the transfer sub-section of the "ones" section of the shift register to be fed to the output relay 124 of the "twos" section of the shift register.

It will therefore be seen that depression of the "0" key causes a "zero" to be entered in the top section of the shift register and also causes the "one" previously entered in the top section to be transferred to the second section. Further operations of the shift register shown in FIGURES 11, 12 and 13 should be obvious from the foregoing explanation. Depression of the "1" key or "0" key will cause the appropriate number to be entered in the top section of the register and will simultaneously cause all numbers previously entered in the register to be transferred to the next lower section. Thus a binary number may be entered in the shift register by the simple expedient of depressing the appropriate keys starting with the highest significant digit.

FIGURE 14 shows a second shift register with keyboard input section which is similar to the device of FIGURE 11, except that each section or order of the shift register has only a positive output. The device of FIGURE 14 differs therefore in that no negative outputs are necessary and thus relays 119, 122, 124 and 128 may be single relays rather than double relays. The operation of the device of FIGURE 14 is substantially identical to that of FIGURE 11 and thus will not be explained again.

FIGURE 15 shows an adder for adding the outputs of the two shift registers shown in FIGURES 11 and 14, respectively. The various sections of the adder for adding respective digits of the binary number are substantially identical so that the adder may best be described by reference to a particular section of the adder, for example, the second or "twos" section.

This section has positive and negative inputs 2A and 2B, respectively, together wtih a second input 2. These inputs are derived from the outputs of the respective shift registers as previously indicated. The input 2A is connected to the outer inlet ports of an input relay 134. The center inlet port of the double input relay 134 is connected to the negative input 2B.

The second input 2 is connected to the control port of the relay 134. The outputs of relay 134 are connected respectively to the inputs of relay 133. The control port of relay 133 is connected to receive a "carry" signal from the preceding section of the adder. The output of the relay 133 is the "twos" output of the adder. The output may be registered, for example, by a fluid pressure relay such as those previously described which is provided with a window to indicate the position of the armature and hence the output of the relay.

The carry sub-sectoin of the "twos" section of the adder is composed of double relay 136 and output relay 137. The lefthand inlet port of relay 136 is connected to a negative fluid pressure source. The center inlet port of relay 136 is connected to the positive input 2A. The righthand inlet port of relay 136 is connected to the reset channel of the computer unit. The outputs of relay 136 are connected respectively to the inputs of relay 137.

Relay 137 has its control port connected in common with relay 133 or alternatively may be constructed as a double relay together with relay 133. The output of relay 137 is connected to the "carry" input relay 138 of the succeeding stage.

It will be noted that the first or "ones" section of the adder differs from the "twos" section in that "carry" input relays corresponding to relays 133 and 137 are omitted. The "carry" output relay 132 may therefore be a single relay and input relay 129 may be connected directly to output 131.

The fifth section of the adder differs in that the "carry" output relay 152 is connected to the sixth order output 153. In this manner the "carry" from the fifth order is indicated as an additional digit rather than being carried to the succeeding stage.

The operation of the adder will be explained with reference to the "twos" or second order section of the adder, previously described. If both inputs to the section are zero, the relay 134 will be oriented in its upward position connecting a negative pressure to the lefthand inlet port of the relay 133 and a positive pressure to the righthand inlet port. Then if there is no "carry" from the preceding stage the armature of the relay 133 will be oriented upward providing a negative output to the indicator 135. The negative output properly indicates a zero in this order of the adder.

If there had been a "carry" in the preceding case, the output of the relay 133 would have been positive thus providing a "1" in the output of this order as required.

In the case of two zero inputs and a "carry" it will be noted that the two lefthand inputs to the relay 136 are negative and that the armature of relay 136 is oriented upward to connect these two negative outputs to the inlet ports of relay 137. There can therefore be no "carry" produced from the second order in the event of two negative inputs to this order.

Considering now the case where a "1" signal is applied to the adder section from either of the shift registers, it will be noted that a "1" signal applied to the inputs 2A and 2B will cause the input 2A to be positive while the input 2B is negative, or in other words to reverse the signs of the inputs to the relay 134. All other things being equal, this would cause the outputs of the relay 134 to similarly be reversed in sign.

A positive or "1" signal at the input 2 to the relay 134 would cause a reversal of sign of the outputs of the relay 134. It will be observed that a reversal of the sign of the outputs of the relay 134 without a change in the orientation of the armature of the relay 133 will cause a reversal of sign at the output of 135. Thus if one of the two inputs from the shift registers is a "1" and there is no "carry" from the relay 132, then the output produced at 135 will be positive representing a "1" signal. In the event that there is a "carry" from the relay 132, the output signal at 135 will be returned to zero by the operation of the relay 133. It will be seen that this condition is in accordance with proper operation of a binary adder.

If both of the signals from the shift registers are positive, representing "1" signals, then the output at indicator 135 will normally be zero or in the presence of a "carry" signal the indicator 135 will be "1." The previous explanation indicates that the reading at the indicator 135 of the second order section of the adder is correct for all possible combinations of inputs and "carry" signals. By reference to the operation of relays 136 and 137 it will now be shown that the "carry" from the second order section has the proper value also. A positive or "1" carry signal should be produced from the relay 137 when two or more of the three inputs (from the two shift registers and the "carry" relay 132) to the second order section are positive.

If the signal applied to the control port 2 of the relay 134 is positive and the "carry" signal from the first order sub-section is positive, it will be noted that the positive reset signal applied to the extreme righthand inlet port of the relay 136 will be directed to the righthand port of the relay 137 and from there to the outlet of relay 137 and to the succeeding stage. Thus where these two of the three inputs to the sub-section, namely the input at 2 and the "carry" from the preceding stage, are positive, a positive "carry" output will be produced from relay 137.

It will readily be observed that if both inputs from the shift registers to the section order adder sub-section are positive or "1" inputs, a positive "carry" output will be produced from relay 137 regardless of whether a "carry" signal from the preceding stage is present or not. The only other condition where a "carry" signal must be produced is that where the input at 2A and 2B is positive and negative, respectively (indicating a "1" signal at this input), and only one of the other two inputs to the adder second order sub-section are positive. It will be noted that under these conditions the two righthand inlet ports of relay 136 are positive so that at least the righthand output of relay 136 must be positive and hence a "carry" signal from the preceding stage applied to relay 137 will cause an output "carry" signal to be produced. Similarly, a positive signal applied to the input 2 will cause both outputs of the relay 136, and hence the output of the relay 137, to become positive and thus provide a "carry" signal to the succeeding stage.

From the foregoing explanation the complete operation of the illustrative computer arrangement of FIGURES 11 through 15 may be understood. It should be understood that many variations may be devised in the arrangement of the relays shown and described above and thus the invention is not to be considered limited to the embodiments shown. In addition, other well known elements might be added, for example check valves could be used to restrict the fluid flow to one direction only. It will be obvious that the relays may be operated in the reverse fashion, that is, by connecting an input to the center valve port and connecting two selectively operable output channels to the outside valve ports. Furthermore, the relays could readily be modified to include a spring or other mechanism to bias the relays to one of their two positions, thereby eliminating the necessity for one of the three fluid pressure sources. It may also be noted that relays for the present invention are not limited to those which have only two positions of operation. Relays having three or more positions of operation could also be used.

All these and many other variations are within the scope of the invention and the fact that preferred embodiments and arrangements of the invention are shown is not to be construed to limit the invention to such embodiments.

What is claimed is:

1. Fluid-pressure digital computer apparatus comprising a fluid-pressure-operated relay including fluid-pressure-actuated means for operating said relay and having at least two fluid-pressure input ports including one port giving ingress to said fluid-pressure-actuated means and further having at least one output port selectively connectable through said relay to at least one of said input ports, a second fluid-pressure-operated relay including fluid-pressure-actuated means for operating said relay and having at least two fluid-pressure input ports including one port giving ingress to the fluid-pressure-actuated means of said second relay and further having at least one output port selectively connectable through said second relay to at least one of the input ports of said second relay, a fluid-pressure path connecting said output port of said first relay to an input port of said second relay, a fluid-pressure path connecting said output port of said second relay to an input port of said first relay, fluid-pressure control means for supplying a fluid-pressure signal to an input port of said first relay, pressure responsive means and a fluid pressure conduit connected from an output port of said second relay to said pressure responsive means for transmission of fluid pressure signals thereto.

2. Fluid-pressure digital computer apparatus comprising a plurality of interconnected fluid-pressure-operated relays each said relay including fluid-pressure-actuated means for operating said relay and having at least two fluid-pressure input ports including one port giving ingress to said fluid-pressure-actuated means and each said relay further having at least one output port selectively connectable through said relay to at least one of said input ports, means for providing a fluid pressure signal from said output ports of respective one of said relays to their respective input ports, fluid-pressure control means for supplying a fluid-pressure signal to an input port of certain of said relays, pressure responsive means and fluid pressure conduits connected from output ports of further ones of said relays to said pressure responsive means for transmission of fluid pressure signals thereto.

3. A digital computer unit comprising a plurality of fluid pressure controlling relays adapted to be operated in response to fluid pressures and each having at least one control input, one other input and one output adapted to deliver one of a plurality of discrete fluid pressure signals in response to pressure conditions at both said inputs, plural means for supplying fluid pressures of distinct values responsive to input data to said unit to inputs of certain ones of said plurality of relays, fluid pressure conduits connecting said one output of at least one of said plurality of relays to respective inputs of at least two others of said plurality of relays, pressure responsive means, and fluid pressure conduits connected to respective outputs of said two others of said plurality of relays and adapted to transmit fluid pressure signals from said relays to said pressure responsive means.

4. A digital computer unit comprising a plurality of fluid pressure controlling relays adapted to be operated in response to fluid pressures and each having at least one control input, one other input and one output adapted to deliver one of a plurality of discrete fluid pressure signals in response to pressure conditions at both said inputs, plural means for supplying fluid pressures of two distinct values responsive to binary input data to said unit to inputs of certain ones of said plurality of relays, fluid pressure conduits connecting said one output of at least one of said relays to respective inputs of at least two others of said plurality of relays, pressure responsive means, and fluid pressure conduits connected to respective outputs of said two others of said plurality of relays and adapted to transmit fluid pressure signals representing binary coded information from said relays to said pressure responsive means.

5. A digital computer unit comprising a plurality of interconnected fluid pressure controlling relays adapted to be operated in responsive to fluid pressures and each having at least one control input, one other input and one output adapted to deliver one of a plurality of discrete fluid pressure signals in response to pressure conditions at both said inputs, plural means for supplying fluid pressures of distinct values responsive to input data to said unit to inputs of certain ones of said plurality of relays, fluid pressure conduits connecting said one output of at least one of said plurality of relays to respective inputs of at least two others of said plurality of relays, further fluid pressure conduits providing return fluid pressure signal paths from an output to an input of certain of said plurality of relays, pressure responsive means, and fluid pressure conduits connected to respective outputs of said two others of said plurality of relays and adapted to transmit fluid pressure signals from said relays to said pressure responsive means.

6. A digital computer comprising a first set and a second set of interconnected pressure controlling relays adapted to be operated in response to fluid pressures and each having at least one control input, one other input and one output adapted to deliver one of a plurality of discrete fluid pressure signals in response to pressure conditions at both said inputs, plural means for supplying fluid-pressures of distinct values responsive to input data to said unit to an input of each of said relays of said first set, fluid pressure conduits connecting said one output of each respective relay of said first set to respective inputs of at least two of said relays of said second set, pressure responsive means, and fluid pressure conduits connected to respective outputs of said relays of said second set and adapted to transmit fluid pressure signals from said relays to said pressure responsive means.

7. A digital computer unit comprising a first set and a second set of fluid pressure controlling relays adapted to be operated in response to fluid pressures and each having at least one control input, one other input and one output adapted to deliver one of a plurality of discrete fluid pressure signals in response to pressure conditions at both said inputs, plural means for supplying fluid pressures of distinct values responsive to input data to said unit to two inputs of each of said relays of said first set, fluid pressure conduits connecting said one output of each respective relay of said first set to respective inputs of at least two of said relays of said second set, further fluid pressure conduits providing return fluid pressure signal paths from an output to an input of certain of said relays of said first and second sets, pressure responsive means, and fluid pressure conduits connected to respective outputs of said relays of said second set and adapted to transmit fluid pressure signals from said relays to said pressure responsive means.

8. A digital computer unit of laminar form comprising a stack of thin layers of material forming a plurality of interconnected fluid pressure controlling relays adapted to be operated in response to fluid pressures and each having at least one control input, one other input and one output; each of said relays comprising a portion of a thin layer of material having an opening in the form of a chamber and slots connecting with said opening forming said inputs and outputs and further thin layers of material on both sides of the first said layer to form sides for said chamber, and means in said chamber for controlling the interconnection of said inputs and outputs in response to fluid pressure signals supplied to said control input; plural means for supplying fluid pressures of distinct values to predetermined ones of said relays; fluid pressure conduits connecting an output of each of the said predetermined ones of said relays to respective inputs of at least two others of said relays; pressure responsive means; and fluid pressure conduits connected to respective outputs of said others of said relays and adapted to transmit fluid pressure signals from said relays to said pressure responsive means, said fluid pressure conduits being formed in part by slots in said thin layers of material.

9. Apparatus as claimed in claim 8, wherein said means for controlling interconnection of said inputs and outputs comprises a piston of sheet material movably arranged in said chamber and having an opening therein which is located to selectively interconnect said slots.

10. Apparatus as claimed in claim 8, wherein said chambers have respective volumes of not more than $1/100$ cubic inches.

11. A digital computer unit of laminar form comprising a stack of thin layers of material forming a plurality of fluid pressure controlling relays adapted to be operated in response to fluid pressures and each having at least one control input, one other input and one output; each of said relays comprising a portion of a thin layer of material having an opening in the form of a relay chamber and slots connecting with said opening forming said inputs and outputs and further thin layers of material on both sides of the first said layer to form sides for said chamber, and means in said chamber for controlling the interconnection of said inputs and outputs in response to fluid pressure signals supplied to said control input; plural means for supplying fluid pressures of distinct values to predetermined ones of said relays; fluid pressure conduits connecting an output of each of the said predetermined ones of said relays to respective inputs of at least two others of said relays; further fluid pressure conduits providing return fluid pressure signal paths from an output to an input of certain of said relays; pressure responsive means; and fluid pressure conduits connected to respective outputs of said others of said relays and adapted to transmit fluid pressure signals from said relays to said pressure responsive means, said fluid pressure conduits being formed in part by slots in said thin layers of material.

12. A digital computer unit comprising a plurality of interconnected fluid pressure controlling relays adapted to be operated in response to fluid pressures and each having at least four inputs and outputs, at least two of which are inputs, one of said four inputs and outputs being adapted to be alternatively coupled to two others of said four inputs and outputs for direct transmission of fluid pressure signals therebetween, plural means for supplying fluid pressures of distinct values to predetermined ones of said relays, fluid pressure conduits connecting an output of each of the said predetermined ones of said relays to respective inputs of others of said relays, pressure responsive means, and fluid pressure conduits connected to respective outputs of said others of said relays and adapted to transmit fluid pressure signals from said relays to said pressure responsive means.

13. A digital computer unit comprising a plurality of interconnected fluid pressure controlling relays adapted to be operated in response to fluid pressures and each having at least four inputs and outputs, at least two of which are inputs, one of said four inputs and outputs being adapted to be alternatively coupled to two others of said four inputs and outputs for direct transmission of fluid pressure signals therebetween, plural means for supplying fluid pressures of distinct values to predetermined ones of said relays, fluid pressure conduits connecting an output of each of the said predetermined ones of said relays to respective inputs of at least two others of said relays, pressure responsive means, and fluid pressure conduits connected to respective outputs of said others of said relays and adapted to transmit fluid pressure signals from said relays to said pressure responsive means.

14. A digital computer unit comprising a plurality of interconnected fluid pressure controlling relays adapted to be operated in response to fluid pressures and each having at least four inputs and outputs, at least two of which are inputs, one of said four inputs and outputs being adapted to be alternatively coupled to two others of said four inputs and outputs for direct transmission of fluid pressure signals therebetween, plural means for supplying fluid pressures of distinct values to predetermined ones of said relays, fluid pressure conduits connecting an output of each of the said predetermined ones of said relays to respective inputs of others of said relays, further fluid pressure conduits providing return fluid pressure signal paths from an output to an input of certain of said relays, pressure responsive means, and fluid pressure conduits connected to respective outputs of said others of said relays and adapted to transmit fluid pressure signals from said relays to said pressure responsive means.

15. A digital computer unit comprising a plurality of interconnected fluid pressure controlling relays adapted to be operated in response to fluid pressures and each having at least four inputs and outputs, at least two of which are inputs, one of said four inputs and outputs being adapted to be alternatively coupled to two others of said four inputs and outputs for direct transmission of fluid pressure signals therebetween, plural means for supplying fluid pressures of distinct values to predetermined ones of said relays, fluid pressure conduits connecting an output of each of the said predetermined ones of said relays to respective inputs of at least two others of said relays, further fluid pressure conduits providing return fluid pressure signal paths from an output to an input of certain of said relays, pressure responsive means, and fluid pressure conduits connected to respective outputs of said others of said relays and adapted to transmit fluid pressure signals from said relays to said pressure responsive means.

16. A digital computer unit comprising a plurality of fluid pressure controlling relays adapted to be operated in response to fluid pressures and each having at least four inputs and outputs, at least two of which are inputs, one of said four inputs and outputs being adapted to be alternatively coupled to two others of said four inputs and outputs for direct transmission of fluid pressure signals therebetween, plural means for supplying two distinct higher and lower value fluid pressures to predetermined ones of said relays, means for selectively supplying pressures of said higher or lower value to predetermined ones of said relays in response to input data to said unit, fluid pressure conduits connecting an output of each of the said predetermined ones of said relays to respective inputs of others of said relays, pressure responsive means, and fluid pressure conduits connected to respective outputs of said others of said relays and adapted to transmit fluid pressure signals from said relays to said pressure responsive means.

References Cited in the file of this patent

UNITED STATES PATENTS

| 107,098 | Post | Sept. 6, 1870 |
| 154,379 | Byrud | Aug. 25, 1874 |
| 1,119,274 | Grandstaff | Dec. 1, 1914 |
| 1,119,380 | Williams | Dec. 1, 1914 |
| 1,270,423 | Lochridge | June 25, 1918 |
| 1,272,889 | Barr et al. | July 16, 1918 |
| 2,082,211 | Moore | June 1, 1937 |
| 2,317,293 | Newell | Apr. 20, 1943 |
| 2,507,498 | Brown | May 16, 1950 |
| 2,751,933 | Urteaga | June 26, 1956 |
| 2,790,427 | Carson | Apr. 30, 1957 |
| 2,889,109 | O'Brien | June 2, 1959 |
| 2,916,205 | Litz | Dec. 8, 1959 |

OTHER REFERENCES

Keister, W. et al.: "The Design of Switching Circuits," Von Nostrand Co. (Oct. 1951), Chapter 22.